(12) United States Patent
Risley

(10) Patent No.: US 7,721,321 B2
(45) Date of Patent: May 18, 2010

(54) METHOD AND APPARATUS FOR REDUCING COMMUNICATION SYSTEM DOWNTIME WHEN CONFIGURING A CRYPTOGRAPHIC SYSTEM OF THE COMMUNICATION SYSTEM

(75) Inventor: Allen D. Risley, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 1020 days.

(21) Appl. No.: 11/036,799

(22) Filed: Jan. 13, 2005

(65) Prior Publication Data
US 2010/0002879 A1 Jan. 7, 2010

Related U.S. Application Data

(60) Provisional application No. 60/633,237, filed on Dec. 4, 2004.

(51) Int. Cl.
*G06F 17/00* (2006.01)
*H04L 29/06* (2006.01)

(52) U.S. Cl. .......................................... 726/1; 713/150
(58) Field of Classification Search ................ 726/1; 713/150
See application file for complete search history.

(56) References Cited

U.S. PATENT DOCUMENTS

| | | | |
|---|---|---|---|
| 5,646,512 A * | 7/1997 | Beckwith ..................... 323/257 |
| 6,671,635 B1 * | 12/2003 | Forth et al. .................... 702/61 |
| 6,745,138 B2 * | 6/2004 | Przydatek et al. ............. 702/61 |
| 6,751,562 B1 | 6/2004 | Blackett et al. | |
| 6,771,058 B2 | 8/2004 | Lapinski et al. | |
| 6,792,337 B2 | 9/2004 | Blackett et al. | |
| 6,820,036 B2 | 11/2004 | Kitamura et al. | |
| 6,944,555 B2 * | 9/2005 | Blackett et al. ................ 702/62 |
| 6,990,395 B2 * | 1/2006 | Ransom et al. ............. 700/295 |
| 7,188,003 B2 * | 3/2007 | Ransom et al. ............. 700/286 |
| 7,191,076 B2 * | 3/2007 | Huber et al. ................... 702/62 |
| 7,216,043 B2 * | 5/2007 | Ransom et al. ............... 702/62 |
| 7,248,977 B2 * | 7/2007 | Hart ............................ 702/62 |
| 7,249,265 B2 * | 7/2007 | von Carolsfeld et al. .... 713/193 |
| 7,272,815 B1 * | 9/2007 | Eldridge et al. ............. 717/101 |

(Continued)

OTHER PUBLICATIONS

Thales Preliminary Product Specification, Thales e-Security Inc.

(Continued)

*Primary Examiner*—Techane J Gergiso
(74) *Attorney, Agent, or Firm*—Eugene M. Cummings, P.C.

(57) ABSTRACT

Disclosed is a method and apparatus for reducing communication system downtime when enabling cryptographic operation of a cryptographic system of the communication system where the cryptographic system includes a first cryptographic device operatively coupled to a plurality of second cryptographic devices via a communication network of the communication system. The method includes causing a pass-through mode of the second cryptographic devices to be suspended, sequentially determining a state of each of the second cryptographic devices, causing the second cryptographic devices and the first cryptographic device to substantially simultaneously operate in a secure mode if each of the second cryptographic devices is determined to have a first state, and causing the second cryptographic devices and the first cryptographic device to operate in the pass-through mode if at least one of the plurality of second cryptographic devices is determined to have a second state.

43 Claims, 7 Drawing Sheets

U.S. PATENT DOCUMENTS

| | | | |
|---|---|---|---|
| 7,290,145 B2* | 10/2007 | Falkenthros | 713/182 |
| 2003/0204756 A1* | 10/2003 | Ransom et al. | 713/300 |
| 2005/0005093 A1* | 1/2005 | Bartels et al. | 713/150 |
| 2005/0144437 A1* | 6/2005 | Ransom et al. | 713/151 |

OTHER PUBLICATIONS

InformAsic LS232100 Data Sheet, InformAsic AB, Oct. 31, 2003.
InformAsic Linkshield Module 232 Product Brief, InformAsic AB.

* cited by examiner

METHOD AND APPARATUS FOR REDUCING COMMUNICATION SYSTEM DOWNTIME WHEN CONFIGURING A CRYPTOGRAPHIC SYSTEM OF THE COMMUNICATION SYSTEM

CROSS-REFERENCE TO RELATED APPLICATIONS

This application claims benefit under 35 U.S.C. §119(e) of U.S. Provisional Application Ser. No. 60/633,237 entitled "A Method to Reduce Network Downtime When Changing Cryptographic Settings or When Commissioning a Cryptographic System", filed on Dec. 4, 2004, naming Allen D. Risley as inventor, the complete disclosure thereof being incorporated by reference.

BACKGROUND OF THE INVENTION

The present invention generally relates to cryptographic systems, and more specifically, to a method and apparatus for reducing communication system downtime when configuring a cryptographic system of the communication system.

Supervisory Control and Data Acquisition (SCADA) systems are used in virtually every industry, but especially in utility industries such as gas delivery, electric power, sewage treatment, water supply, transportation, etc. A SCADA system is one type of communication system and includes, among other things, a control center having an operator display/control panel and a SCADA master operatively coupled to the operator display/control panel. A typical SCADA system is configured to measure key operating aspects of a process or system, and then to transmit via a SCADA communication network, the associated measurement data to a central control center. Operators, either human or machine at the control center, make decisions based on the measurement data. The SCADA system is also configured to transmit commands from the operators to the process or system via the SCADA communication network.

As is known, the SCADA communication network may include one of any number of suitable communication network links, depending on the process or system monitored by the SCADA system. For example, the SCADA communication network may include radio, analog and/or digital microwave links, fiber optic links, analog or digital modems on utility owned or leased telephone circuit links, or even the public switched telephone network.

In the electric utility industry a SCADA system may be configured to measure the voltages associated with a power system substation bus (i.e., bus voltages), to measure the current coming into the bus from a power transmission line (i.e., a line current), and to measure the status or position of numerous switches in the substation. The status measurements may include indications of circuit breaker positions and electrical power routing switch positions (e.g., open position, closed position). The SCADA system may also be configured to transmit the current, voltage and switch position measurements to a central control center (CC) via a SCADA communication network for review by an operator. The operator can then make decisions such as closing a circuit breaker to enable additional electric power to a particular load. In that case, a command from the operator delivered via the SCADA communication network results in closure of the circuit breaker.

"Intelligent" devices of the SCADA system that measure the current, voltage and switch positions, and that cause actions to be taken based on commands from the operator are often referred to as intelligent electronic devices (IEDs). The IEDs may include an electric power meter, a programmable controller, a Remote Terminal Unit (RTU), a communications processor, a protective relay, or any number of other suitable intelligent devices configured to take measurements, transmit those measurements over the SCADA communication network to the SCADA master and the operator display/control panel, and respond to commands sent via the operator display/control panel over the SCADA communication network.

As previously mentioned, the SCADA communication network may include any one of a number of suitable communication network links. A typical SCADA communication network may also span long distances of many miles. Unfortunately, due to their sheer expanse, SCADA communication networks are vulnerable to electronic intrusions thereby putting associated IEDs and other SCADA system components at risk for compromise by an eavesdropper (e.g., adversary, attacker, interceptor, interloper, intruder, opponent, enemy). For example, if an eavesdropper gains access to a telephone circuit used to transmit switch position measurements from a power system substation to a CC and used to transmit circuit breaker control commands from the CC to the substation, the eavesdropper could launch numerous attacks on the power system. Such an attack may include altering settings on a protective relay thereby rendering the relay useless in the event of a short circuit, IED damage, operator confusion causing unnecessary power system blackouts, etc. Further, for systems other than power systems, the eavesdropper may cause havoc to any SCADA-monitored critical infrastructure including natural gas delivery systems, transportation or communications systems, waste water treatment and fresh water delivery, etc. The US government has recognized this growing threat. In a report created by the U.S. Department of Energy titled "21 Steps to Improve Cyber Security of SCADA communication networks" published jointly by the President's Critical Infrastructure Protection Board, and the Office of Energy Assurance, the authors concluded:

"Supervisory control and data acquisition (SCADA) networks contain computers and applications that perform key functions in providing essential services and commodities (e.g., electricity, natural gas, gasoline, water, waste treatment, transportation) to all Americans. As such, they are part of the nation's critical infrastructure and require protection from a variety of threats that exists in cyber space today. By allowing the collection and analysis of data and control of equipment, such as pumps and valves from remote locations, SCADA communication networks provide great efficiency and are widely used. However, they also present a security risk: SCADA communication networks were initially designed to maximize functionality, with little attention paid to security. As a result, performance, reliability, flexibility and safety of distributed control/SCADA systems are robust, while the security of these systems is often weak. This makes some SCADA communication networks potentially vulnerable to disruption of service, process redirection or manipulation of operational data that could result in public safety concerns and/or serious disruptions to the nation's critical infrastructure. Action is required by all organizations, government or commercial, to secure their SCADA communication networks as part of the effort to adequately protect the nation's critical infrastructure".

To address the SCADA communication network security issue, numerous types of cryptographic devices are used to encrypt, decrypt and authenticate the data transmitted by a SCADA communication network. Unfortunately, current cryptographic devices require manual installation, manual cryptographic setting changes and manual commissioning; a time consuming effort for a typical SCADA communication network spanning many miles. As a result, IEDs in need of cryptographic protection remain unprotected for unacceptable time periods until all of the cryptographic devices associated with the individual IEDs and the SCADA master have been installed, commissioned or had settings changed. As each cryptographic device is installed, the SCADA master loses communication with the IED's connected to the SCADA communication network segment associated with that cryptographic device. As installation of new cryptographic devices progress, the SCADA master loses communication with more of the IEDs until all cryptographic devices have been installed, including the cryptographic device for the SCADA master. Such a lack of complete SCADA communications may continue for days or even weeks, depending on how long it takes an operator(s) to visit all of the sites of the SCADA system 10 requiring cryptographic device installation.

Moreover, if the cryptographic device is installed on the SCADA master first, then the SCADA master will lose communications with all equipment on the SCADA communication network until cryptographic devices are installed at the various IEDs. The best a cryptographic device installer can do is to install cryptographic devices at about half of the IEDs, and then install the cryptographic device at the SCADA master. The SCADA master will lose communications with the half of the equipment not connected to cryptographic devices until the installer completes installing cryptographic devices at all of the intended sites.

When installed, each of the cryptographic devices may be manually placed in a "pass-through mode", making the cryptographic device transparent to the SCADA communication network. Unlike encryption/decryption operation or "secure mode operation", a cryptographic device in the pass-though mode performs no encryption, decryption, or authentication functions for data transmitted via the SCADA communication network. Unfortunately, cryptographic devices are placed in and removed from pass-through mode via either a hardware switch or button, or via an electronic command received via a maintenance interface of the cryptographic device. As a result, an installer has to travel from cryptographic device location to cryptographic device location to place the cryptographic devices in, or remove them from, pass-through mode. During that time, the SCADA system remains unprotected from eavesdropper activity.

Similarly, as each installed cryptographic device is undergoing a parameter value change (e.g., an encryption key change, an initialization vector size change, a synchronization mode change, a network architecture parameter change, a max allowable frame length parameter change), the SCADA master loses communication with the SCADA communication with the IEDs connected to the network segment associated with that cryptographic device. As each of the installed cryptographic devices are visited by an operator to change parameter values, the SCADA master loses communication with more of the IEDs until all cryptographic devices have undergone parameter value changes. Again, the lack of complete SCADA communications may continue for days or even weeks, depending on how long it takes an operator(s) to visit all of the sites of the SCADA system 10 requiring parameter value updates or changes. Moreover, if the parameter value(s) of the cryptographic device associated with the SCADA master are updated first, then the SCADA master will lose communications with all equipment on the SCADA communication network until all of the parameters values of the remaining cryptographic devices are similarly updated.

SUMMARY OF THE INVENTION

According to an aspect of the invention, provided is a method and apparatus for reducing communication system downtime when enabling cryptographic operation of a cryptographic system of the communication system. The cryptographic system includes a first cryptographic device operatively coupled to a plurality of second cryptographic devices via a communication network of the communication system. The method includes causing a first mode, or pass-through mode of the first and second cryptographic devices to be suspended. The pass-through mode renders the second cryptographic devices transparent to the communication network. The method also includes sequentially determining a state of each of the second cryptographic devices, causing the second cryptographic devices and the first cryptographic device to substantially simultaneously operate in a second mode, or secure mode if each of the second cryptographic devices is determined to have a first state. The secure mode enables cryptographic operation on data transmitted via the communication network. The method further includes causing the second cryptographic devices and the first cryptographic device to operate in the pass-through mode if at least one of the plurality of second cryptographic devices is determined to have a second, or a non-readiness, state. In an embodiment, the communication system is a supervisory control and data acquisition (SCADA) system, and the communication network is a SCADA communication network.

According to another aspect of the invention, provided is a method for reducing communication system downtime when changing at least one parameter value of a cryptographic system of the communication system. The cryptographic system includes a first cryptographic device operatively coupled to a plurality of second cryptographic devices via a communication network of the communication system. Each of the first cryptographic device and the plurality of second cryptographic devices operate in a second mode, or secure mode using a first set of parameter values. The method includes detecting receipt of a first command to synchronously enable second mode operation using a second set of parameter values of the plurality of second cryptographic devices and the first cryptographic device, sequentially determining a state of each of the plurality of second cryptographic devices, and causing the plurality of second cryptographic devices and the first cryptographic device to substantially simultaneously operate in the second mode using the second set of parameter values if each of the plurality of second cryptographic devices is determined to have a first state. At least one of the second set of parameter values is different from the first set of parameter values. In an embodiment, the communication system is a supervisory control and data acquisition (SCADA) system and the communication network is a SCADA communication network.

According to yet another aspect of the invention, provided is an apparatus for reducing communication system downtime when enabling cryptographic operation of a cryptographic system of the communication system where the communication system includes a communication network. The apparatus includes a first cryptographic device having a first microcontroller, and a plurality of second cryptographic devices operatively coupled to the first cryptographic device via the communication network. Each of the plurality of second cryptographic devices includes a second microcontroller. The first microcontroller is adapted to cause a first mode of the plurality of second cryptographic devices to be suspended. The first mode renders the plurality of second cryptographic devices transparent to the communication network. The first microcontroller is further adapted to sequentially determine a state of each of the plurality of second cryptographic devices, and to cause the plurality of second cryptographic devices and the first cryptographic device to substantially simultaneously operate in a second mode if each of the plurality of second cryptographic devices is determined to have a first state. The second mode enables cryptographic operation on data transmitted via the communication network. In an embodiment, the communication system is a supervisory control and data acquisition (SCADA) system, and the communication network is a SCADA communication network.

According to a further aspect of the invention, provided is an apparatus for reducing communication system downtime when changing at least one parameter value of a cryptographic system of the communication system where the communication system includes a communication network. The apparatus includes a first cryptographic device having a first microcontroller, and a plurality of second cryptographic devices operatively coupled to the first cryptographic device via the communication network where each of the plurality of second cryptographic devices has a second microcontroller. Each of the first cryptographic device and the plurality of second cryptographic devices operate in a second mode, or secure mode, using a first set of parameter values. The first microcontroller is adapted to detect receipt of a first command to synchronously enable second mode operation using a second set of parameter values for the plurality of second cryptographic devices and the first cryptographic device. The microcontroller is further adapted to sequentially determine a state of each of the plurality of second cryptographic devices, and cause the plurality of second cryptographic devices and the first cryptographic device to substantially simultaneously operate in the second mode using the second set of parameter values if each of the plurality of second cryptographic devices is determined to have a first state where at least one of the second set of parameter values is different from the first set of parameter values. In an embodiment, the communication system is a supervisory control and data acquisition (SCADA) system and the communication network is a SCADA communication network.

DETAILED DESCRIPTION OF THE INVENTION

Figure 1:
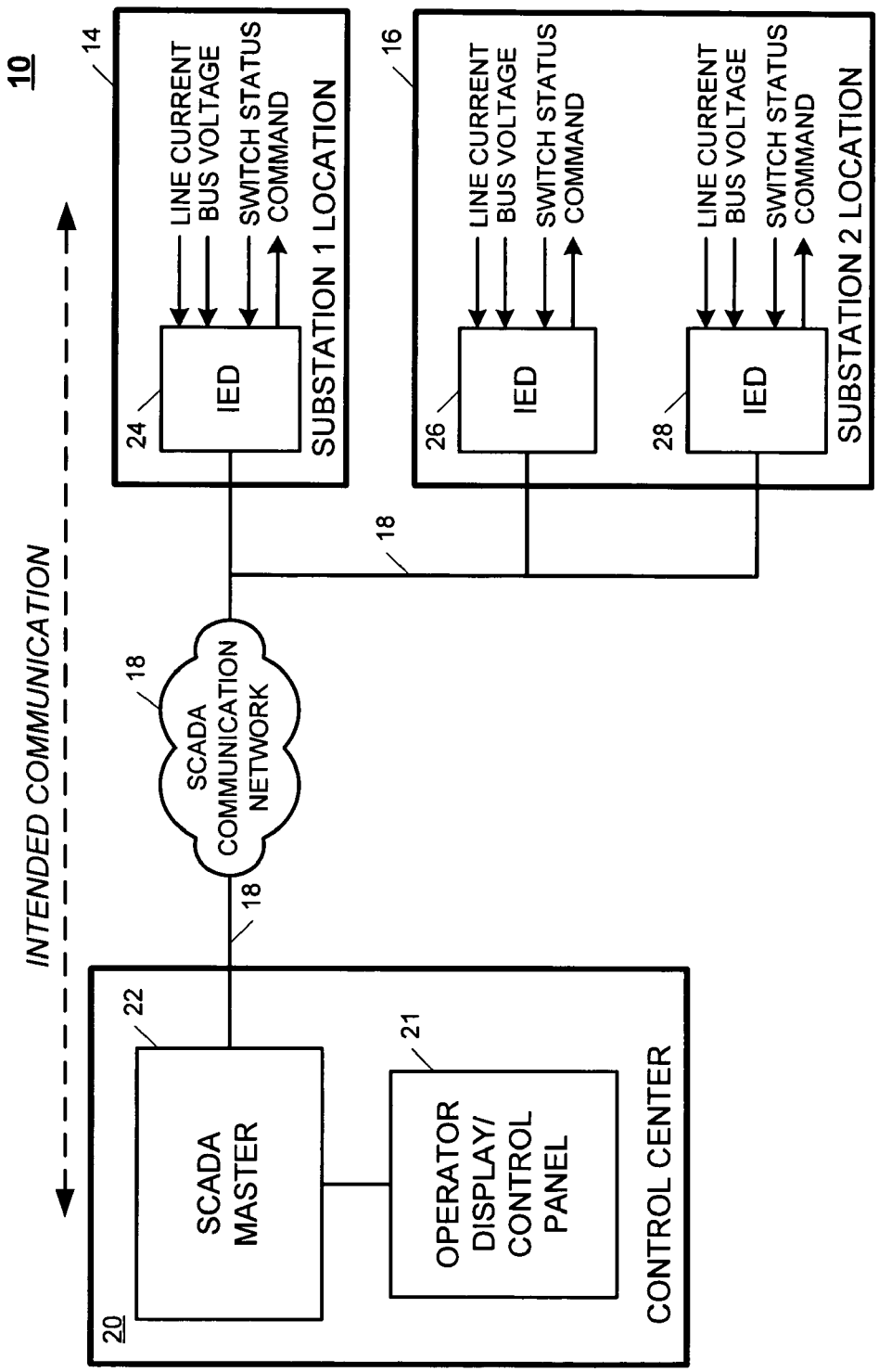
FIG. 1 is a block diagram of a SCADA system.

FIG. 1 is a block diagram of an exemplary SCADA system 10. The SCADA system 10 includes a control center (CC) 20 operatively coupled to a first substation 14 and a second substation 16 of a power system via a SCADA communication network 18. The control center 12 includes an operator display/control panel 21 operatively coupled to a SCADA master 22. The first substation 14 is monitored by a first IED 24, and the second substation 16 is monitored by second and third IEDs 26 and 28. As illustrated in FIG. 1, each of the IEDs 24, 26, 28 are configured to measure line current, bus voltage and switch positions, and cause actions to be taken based on commands from an operator via the operator display/control panel 21.

During operation, the SCADA master 22 controls acquisition of information/data from each of the IEDs 24, 26, 28 and displays the information/data on the operator display/control panel 21. Decisions are then made by an operator based on the information/data and the results of those decisions are forwarded to the appropriate IED(s) via the SCADA master 22.

Also during operation, the IEDs measure line current, bus voltage and switch positions, transmit those measurements over the SCADA communication network 18 to the SCADA master 22, and respond to commands sent via the operator display/control panel 20 over the SCADA communication network 18 to perform selected tasks such as enabling additional electric power to be supplied to a particular load of the associated power system.

Figure 2:
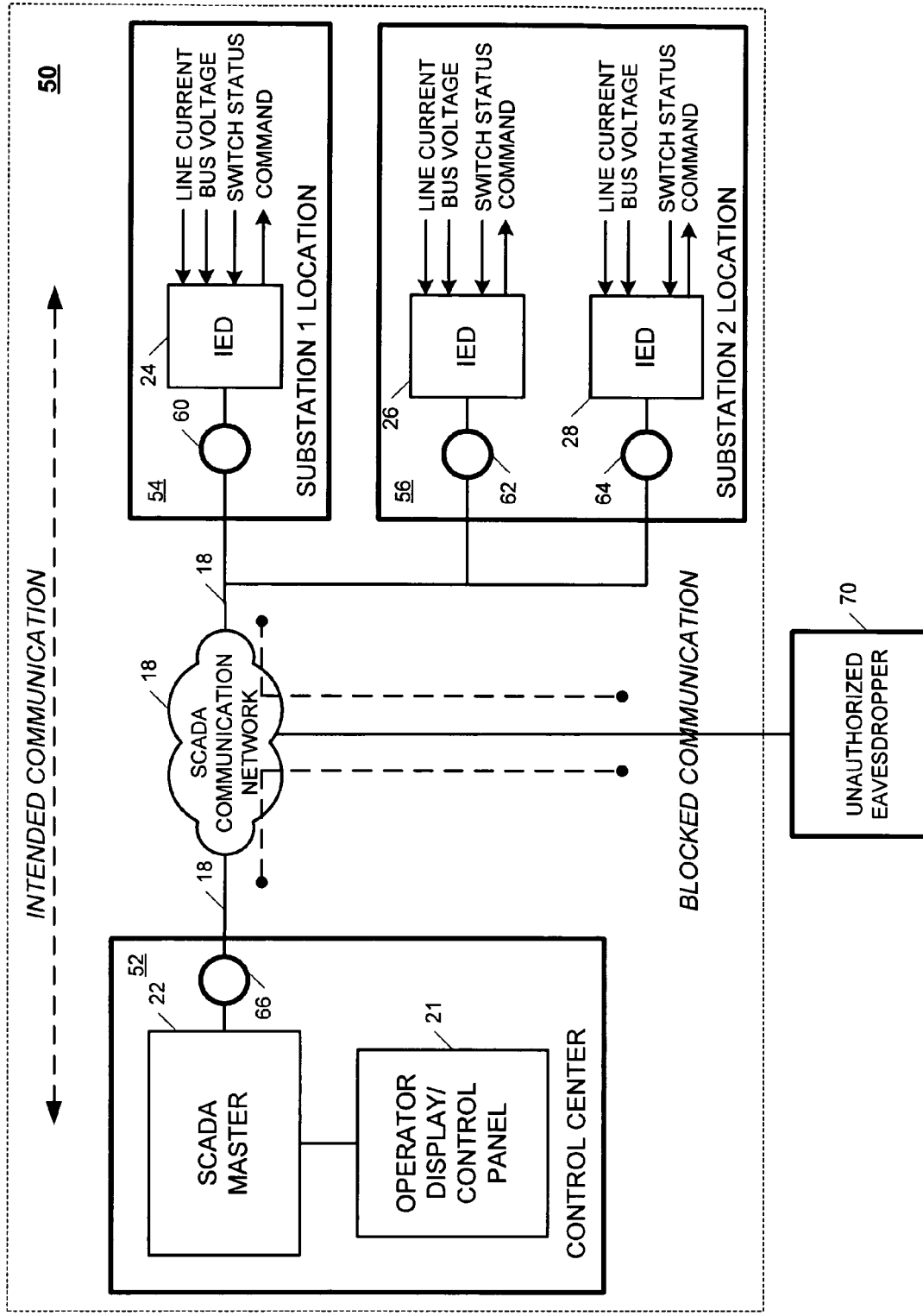
FIG. 2 is a block diagram of a SCADA system according to an embodiment of the invention.

As previously mentioned, SCADA communication networks are vulnerable to electronic intrusions by an eavesdropper. FIG. 2 is a block diagram of a SCADA system 50 including a number of cryptographic devices 60, 62, 64, 66. The cryptographic devices 60, 62, 64, 66 are capable of synchronized commissioning without individual manual intervention and capable of synchronized parameter values change without long SCADA system outages according to an embodiment of the invention. When in secure mode operation, the cryptographic devices 60, 62, 64, 66 provide encryption/decryption and authentication for data transmitted via the SCADA system 50.

Referring to FIG. 2, the SCADA system 50 includes the control center 52 operatively coupled to a first substation 54 and a second substation 56 of a power system via the SCADA communication network 18. The control center 52 includes the operator display/control panel 21 operatively coupled to the SCADA master 22. The first substation 54 is monitored by the first IED 24, and the second substation 56 is monitored by the second IED 26 and the third IED 28. As illustrated in FIG. 2, each of the IEDs 24, 26, 28 are configured to measure line current, bus voltage and switch positions, and cause actions to be taken based on commands from an operator via the operator display/control panel 20. Although adapted for an electrical power system, it is contemplated that the SCADA system 50 may be adapted for use in any number of systems such as natural gas delivery systems, transportation or communications systems, waste water treatment and fresh water delivery, etc. Further, although configured with three IEDs, it is contemplated that the SCADA system 50 may include many IEDs capable of many different configurations.

Each of the IEDs 24, 26, 28 and the SCADA master 22 is operatively coupled to respective cryptographic devices 60, 62, 64, 66. As illustrated, the first cryptographic device 60 is operatively coupled to the first IED 24, the second cryptographic device 62 is operatively coupled to the second IED 26, the third cryptographic device 64 is operatively coupled to the third IED 28, and the fourth cryptographic device 66 is operatively coupled to the SCADA master 22. For ease of discussion the fourth cryptographic device is referred to hereinafter as the master cryptographic device 66.

During operation, data originating from IEDs 24, 26, 28 is encrypted before being transmitted via the SCADA communication network 18. Transmitted data received by the control center 52 it is then decrypted and authenticated by the master cryptographic device 66 before it is passed to the SCADA master 22. Likewise, control commands from the SCADA master 22 or elsewhere in the control center 52 are encrypted by the master cryptographic device 66 before they are delivered to the SCADA communication network 18. The receiving cryptographic device (e.g., the cryptographic device 60) then decrypts and authenticates the control commands before they are passed to the associated IED (e.g., the IED 24) whereupon an IED function is performed.

Cryptographic devices 60, 62, 64, 66 operate to conceal transmitted data via one of any number of well-known encryption protocols (e.g., Advanced Encryption Standard (AES), Data Encryption Standard (DES), triple DES, DESX, CRYPT(3), DES with Key-Dependent S-Boxes). When in a secure operating mode, each of the cryptographic devices 60, 62, 64, 66 installed in a data path between respective IEDs 24, 26, 28 and the SCADA master 22, prevent an unauthorized eavesdropper 70 from accessing the data or control command/message content transmitted via the SCADA communication network 18.

Figure 3:
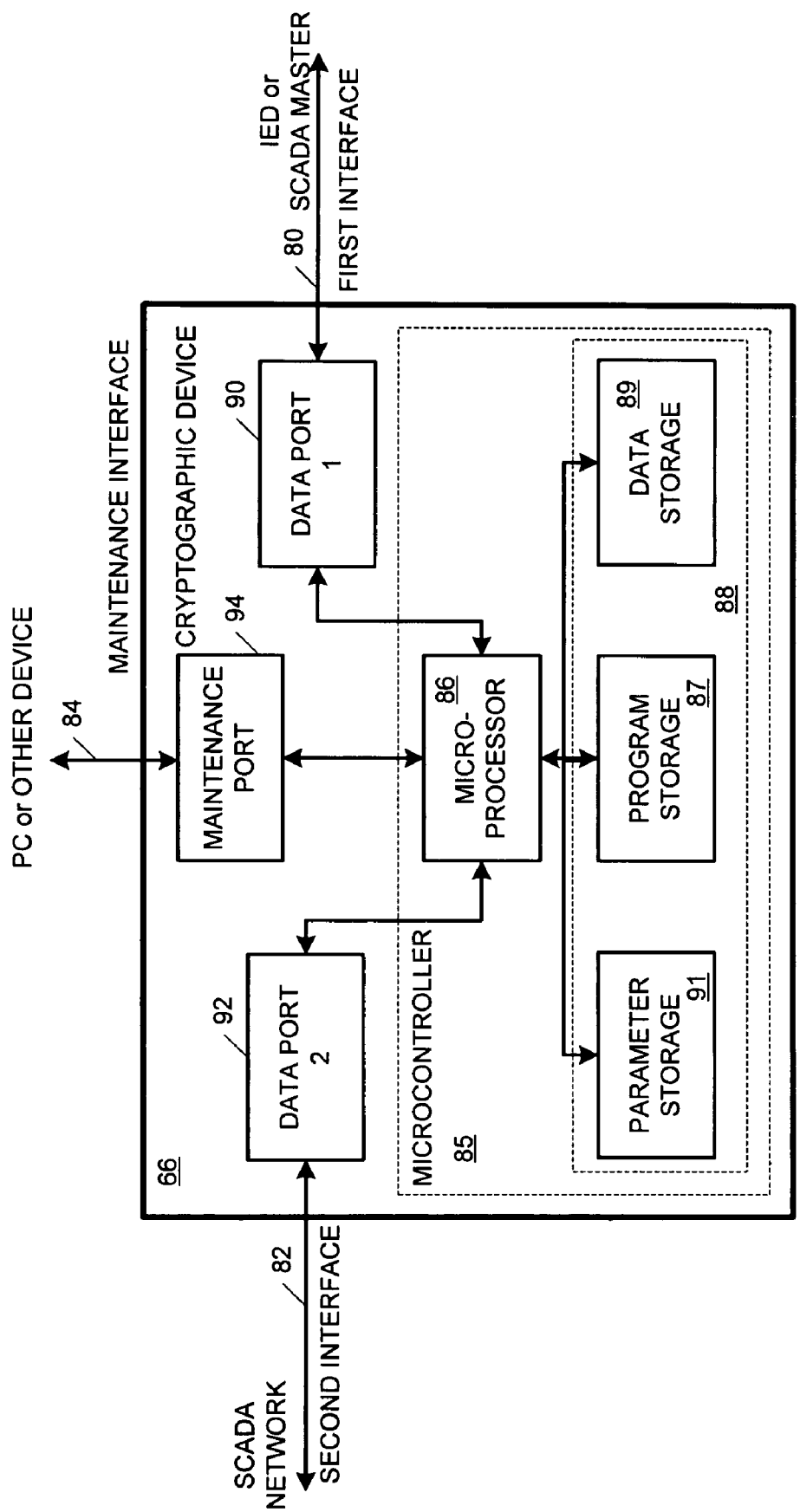
FIG. 3 is a more detailed diagram of a cryptographic device according to an embodiment of the invention.

FIG. 3 is a more detailed diagram of the master cryptographic device 66 according to an embodiment of the invention. Although not separately discussed in detail, it should be understood that each of the cryptographic devices 60, 62, 64 are similarly configured and operable.

Referring to FIG. 3, the master cryptographic device 66 includes a first interface, or trusted interface 80, configured to be connected to an IED or SCADA master, and a second interface, or un-trusted interface 82, configured to be connected to the SCADA communication network 18. A third interface or maintenance interface 84 may also be included for maintenance purposes such as configuring, controlling, or temporarily monitoring the cryptographic device 66. In some instances the maintenance interface 84 is included on the same physical interface as the trusted interface 80 or the un-trusted interface 82. Further, for cryptographic device versatility, the trusted interface 80 may be configurable as an un-trusted interface 82, and the un-trusted interface 82 may be configurable as the trusted interface 80. In other words, the interfaces 80 and 82 may be configured as either trusted or un-trusted interfaces As previously mentioned, during operation, the master cryptographic device 66 encrypts data received from the SCADA master 22 via the trusted interface 80 before transmitting it via the un-trusted interface 82. Conversely, the master cryptographic device 66 decrypts data received via the un-trusted interface 82 before transmitting it via the trusted interface 80.

The master cryptographic device 66 also includes a microcontroller 85 having a microprocessor 86 and a memory 88 operatively coupled to the microprocessor 86. The memory 88 is configured to store cryptographic device parameters such as data rates, and cryptographic device data such as the encryption key and programs or routines that enable synchronized commissioning and a synchronized parameter values change. First and second data ports 90, 92 couple the microcontroller 85 to the trusted interface 80 and the un-trusted interface 82, respectively. Similarly, a maintenance data port 94 couples the microcontroller 85 to the maintenance interface 84.

During operation, the microprocessor 86, executing a program stored in a program storage block 87 of the memory 88 performs inter alia, encryption, decryption and authentication. Resulting intermediate and temporary data is stored in a data storage block 89 of the memory 88. During operation, the microprocessor 86 also performs inter alia, retrieval and optional modification of parameters that define various attributes of cryptographic device operation (e.g., data rates, which of Port 1 and Port 2 are the trusted and un-trusted ports, encryption keys, etc.). The parameters are stored in a parameter storage block 91 of the memory 88.

As previously mentioned, cryptographic devices may be manually placed in a pass-through mode, making the cryptographic devices in the pass-through mode transparent to the SCADA communication network. Such transparency may be desired when a number of cryptographic devices are being installed or reconfigured with parameter updates, etc. Unfortunately, an installer has to travel from prior art cryptographic device to prior art cryptographic device to manually place them in and or remove them from pass-through mode. During that time period, communication between the SCADA master and the IEDs is compromised as described above.

Unlike prior art installed cryptographic devices that require individual manual intervention to transition from the pass-through mode operation to secure mode operation, the cryptographic devices 60, 62, 64, 66 are configured to enable synchronized commissioning. That is, the cryptographic devices 60, 62, 64, 66 are configured to transition from a first mode, or the pass-through mode, to a second mode operation, or secure mode operation, in response to a command received from another cryptographic device or another device connected to the SCADA communication network 18. As a result, SCADA system downtime is reduced.

Further, unlike prior art installed cryptographic devices, the cryptographic devices 60, 62, 64, 66 are configured to enable a synchronized parameter values change. That is, the cryptographic devices 60, 62, 64, 66 are configured to transition from secure mode operation based on a first set of stored configuration parameters, to secure mode operation based on a second set of stored configuration parameters, in response to a command received from another cryptographic device or another device connected to the SCADA communication network 18. As a result, SCADA system downtime is reduced.

Figure 4:
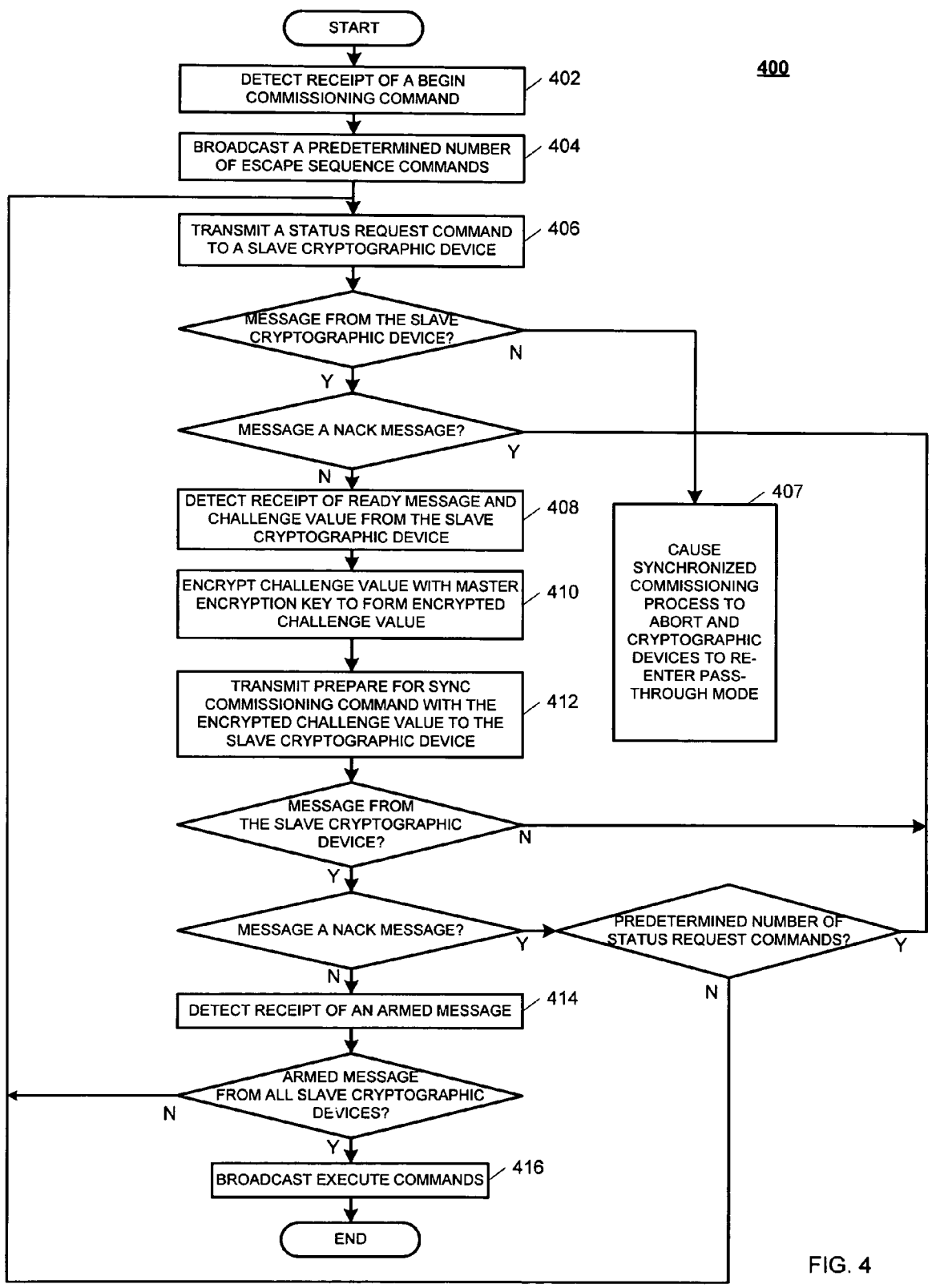
FIG. 4 is a flowchart of a synchronized commissioning process according to the present invention.

FIG. 4 is a flowchart of a synchronized commissioning process 400 according to the present invention. Performance of the synchronized commissioning process 400 reduces SCADA system down-time when installing cryptographic devices on an existing SCADA communication network 18 and when transitioning the installed cryptographic devices from a pass-through mode to secure mode operation. For ease of discussion, the microcontroller 85 of the master cryptographic device 66 acts as a "master" controlling the synchronized commissioning process 400. The microcontrollers of the remaining cryptographic devices 60, 62, 64 respond as "slaves" to messages from the microcontroller 85. It should be understood however, that the microcontrollers of the cryptographic devices 60, 62, 64, 66 may act as the master or the slave, or that another suitably configured SCADA system device may act as the master.

Figure 5:
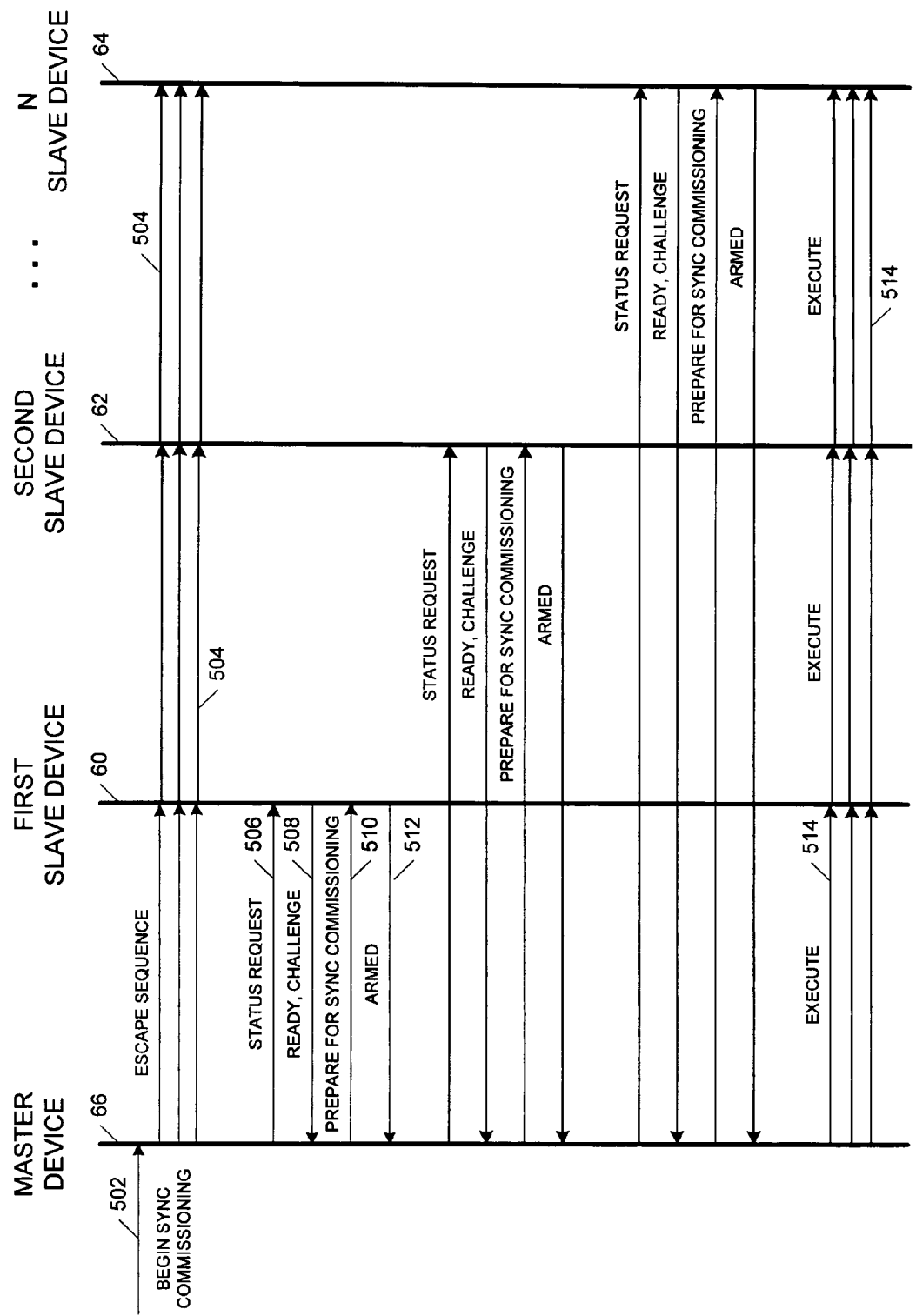
FIG. 5 is a ladder diagram of an exemplary communication flow between the master cryptographic device and the slave cryptographic devices during the synchronized commissioning process of FIG. 4.

FIG. 5 is a ladder diagram 500 of an exemplary communication flow between the master cryptographic device 66 and the slave cryptographic devices 60, 62, 64 during the synchronized commissioning process 400. Although the ladder diagram 500 illustrates one communication flow that occurs during the synchronized commissioning process 400, it is contemplated that other communication flows may be implemented to enable the synchronized commissioning process 400.

Referring to FIGS. 4 and 5, the synchronized commissioning process 400 begins when the microcontroller 85 detects receipt of a BEGIN SYNC COMMISSIONING command 502 (step 402). The BEGIN SYNC COMMISSIONING command 502 may be initiated in one of any number of ways using one of any number of methods. For example, the BEGIN SYNC COMMISSIONING command 502 may result from an operator input received via the maintenance interface 84. The BEGIN SYNC COMMISSIONING command 502 may also result from actuation of a switch, button, etc. on the master cryptographic device 66.

Prior to installation, each of the plurality of cryptographic devices 60, 62, 64, 66 is pre-configured with a first set of parameter values that include an encryption key, a cryptographic device configuration, a data rate, a maximum data frame length, a maximum dead time, a number of data bits, a number of stop bits and a parity bit configuration, etc. Each of the plurality of cryptographic devices 60, 62, 64, 66 is also pre-configured to be in a pass-through mode when first installed and pre-configured to participate in the synchronization commissioning process upon receipt of a suitable commissioning command from the master cryptographic device 66.

During installation of cryptographic devices 60, 62, 64, respective IED operation and communication to the SCADA master 22 is interrupted only during the time the data path is interrupted. That is, operation of and communication from the IED to the SCADA master 22 is interrupted from the time an installer disconnects a data communications cable from its respective IED to install the cryptographic device, to the time the cryptographic device is operational in the pass-through mode. Thus, the time the data path is interrupted is measured in minutes, rather than in the days and weeks required for installation of prior art cryptographic devices using prior art installation methods. Similarly, during installation of the cryptographic device 66 between the SCADA master 22 and the SCADA communication network 18, communication to all IEDs is interrupted only during the time the data path is interrupted, a time again measured in minutes. When first installed and in pass-through mode, the cryptographic devices 60, 62, 64, 66 are transparent to the SCADA system 50 and therefore the SCADA system 50 operates much like the SCADA system 10 of FIG. 1.

Referring again to FIGS. 4 and 5, upon receipt of the BEGIN SYNC COMMISSIONING command 502, the microcontroller 85 of the master cryptographic devices 66 begins the process of transitioning each of the slave cryptographic devices 60, 62, 64 from pass-through mode to secure mode operation to secure the SCADA communication network 18 against electronic intrusion by an eavesdropper. The previously stored parameter values stored in the memories of respective cryptographic devices are also placed into operation.

The transition to secure mode operation begins when the master cryptographic device 66 broadcasts a predetermined number of ESCAPE SEQUENCE commands 504 to cause the slave cryptographic devices 60, 62, 64 to temporarily suspend the pass-through mode upon receipt of one ESCAPE SEQUENCE messages 504 (step 404). The ESCAPE SEQUENCE messages 504 is preferably a string of characters unlikely to be generated by the underlying protocol, followed by a predetermined idle time period during which no data is transmitted by the master cryptographic device 66. It should be understood however, that the ESCAPE SEQUENCE command 504 may be any suitably configured command that operates to temporarily suspend the pass-through mode.

After broadcasting a series of ESCAPE SEQUENCE commands 504, the master cryptographic device 66 begins exchanging a series of commands/messages in a sequential or polling fashion, with each of the slave cryptographic device 60, 62, 64 to ensure that each is properly configured for synchronized commissioning.

The master cryptographic device 66 may begin the sequential polling by transmitting a STATUS REQUEST command 506 to a first slave cryptographic device, or the slave cryptographic device 60 (step 406). The slave cryptographic device 60 may respond in one of two ways. If it is not properly configured for synchronized commissioning, it will respond with a negative acknowledgement (NACK) message to the master cryptographic device 66. In other words, the NACK message indicates a non-readiness to participate in the synchronized commissioning, or a non-readiness state. If the slave cryptographic device 60 is properly configured for synchronized commissioning, it will respond with a ready acknowledgement (RDY) message and a "challenge value" 508 to the master cryptographic device 66. The challenge value is used for encrypting/decrypting and authentication purposes.

Upon receiving a NACK message from the slave cryptographic device 60, the microcontroller 85 causes the synchronized commissioning process 400 to be aborted. After a predetermined time period, all of the cryptographic devices 60, 62, 64, 66 revert back to pass-through mode (step 407). Similarly, if no response is received from the slave cryptographic device 60 within a predetermined time period, the microcontroller 85 causes the synchronized commissioning process 400 to be aborted and all of the cryptographic devices 60, 62, 64, 66 to revert back to pass-through mode (step 407).

Conversely, upon receiving the RDY message and challenge value 508 from the slave cryptographic device 60, the microcontroller 85 proceeds with the synchronized commissioning process 400 (step 408). The microcontroller 85 first encrypts the challenge value with its master encryption key to form an encrypted challenge value (step 410), and then causes a PREPARE FOR SYNC COMMISSIONING command 510 to be transmitted to the slave cryptographic device 60 (step 412). The PREPARE FOR SYNC COMMISSIONING command 510 includes the encrypted challenge value calculated by the microcontroller 85.

When received, the encrypted challenge value is decrypted by the microcontroller of the slave cryptographic device 60 to form a decrypted challenge value, and then compares the decrypted challenge value to the original challenge value generated by the slave cryptographic device 60. If the decrypted challenge value does not match the original challenge value, the slave cryptographic device 60 responds with a NACK message to the master cryptographic device 66.

Upon receipt of the NACK message, the master cryptographic device 66 determines whether a predetermined number of STATUS REQUEST commands 506 have been previously sent to the slave cryptographic device 60. If the predetermined number of STATUS REQUEST commands 506 have not been previously sent to the slave cryptographic device 60, the microcontroller 85 again causes the STATUS REQUEST message 506 to be transmitted to the slave cryptographic device 60 (step 406). The message exchange between the master cryptographic device 66 and the slave cryptographic device 60 repeats until the predetermined number of STATUS REQUEST commands 506 to the slave cryptographic device 60 have been reached or until receipt of an ARMED message 512 from the slave cryptographic device 60. If the predetermined number of STATUS REQUEST commands 506 have been sent to the slave cryptographic device 60, the microcontroller 85 causes the synchronized commissioning process 400 to be aborted and the master cryptographic device 66 reverts back to pass-though mode operation. After a predetermined time period, all of the slave cryptographic devices 60, 62, 64 to revert back to pass-through mode operation (step 407). Thus when not ARMED and EXECUTED within a time limit, the cryptographic devices 60, 62, 64, 66 revert back to pass-through mode If the decrypted challenge value matches the original challenge value, the slave cryptographic device 60 responds to the master cryptographic device 66 with the ARMED message 512 to indicate a ready condition for synchronized commissioning. In other words, the ARMED message 512 indicates a readiness to participate in the synchronized commissioning. Upon receipt of the ARMED message 512 from the slave cryptographic device 60, the microcontroller 85 causes the STATUS REQUEST command 506 to be transmitted to the second slave cryptographic device 62. The process is repeated for each slave cryptographic device of the SCADA system 50. If any of the slave cryptographic devices of the SCADA system 50 respond with a NACK message, the master cryptographic device 66 causes the synchronized commissioning process 400 to be aborted.

When all of the slave cryptographic devices 60, 62, 64 have been poled and have responded with the ARMED message 512 indicating a ready condition for synchronized commissioning, the microcontroller 85 causes a pre-determined number of EXECUTE commands 514 to be simultaneously broadcast to the slave cryptographic devices 60, 62, 64 to place them in secure mode operation (step 416).

The master cryptographic device 66 begins secure mode operation (encrypting and encrypting according to the previously programmed secret encryption key and other operational parameters) after the last EXECUTE command 514 is broadcast. The slave cryptographic devices 60, 62, 64 begin secure mode operation upon receipt of the EXECUTE command 514, provided the slave cryptographic device(s) 60, 62, 64 have previously successfully transmitted the ARMED message 512.

Performance of the synchronized commissioning process 400 via the serial polling scheme described above yields a total time elapsed between the first ESCAPE SEQUENCE command 504 and the last EXECUTE command 514, of less than one second. During that very brief time period, SCADA communications between the master cryptographic device 66 and the slave cryptographic devices 60, 62, 64 are temporarily non-operational.

As may be apparent from the above discussion, the slave cryptographic devices 60, 62, 64 authenticate commands and requests transmitted from the master encryption device 66 using an encrypted challenge/response scheme. It should be understood however, that other well known authentications schemes may be used.

As described in connection with FIG. 3, during operation of the master cryptographic device 66, the microprocessor 86 performs inter alia, retrieval and optional modification of the first set of parameters that define various attributes of cryptographic device operation (e.g., data rates, which of Port 1 and Port 2 are the trusted and un-trusted ports, encryption keys, etc.). The first set of parameters values is stored in the parameter storage block 91 of the memory 88. In some cases it may be necessary to change or update one or more of the parameter values of the first set of parameter values to form a second set of parameter values. For example, it may be necessary to change the encryption keys used by the master cryptographic device 66 and all of the slave cryptographic devices of the SCADA system 50.

Using prior art methods, as each installed cryptographic device is undergoing a parameter value change (e.g., an encryption key change), communication is lost between the SCADA master loses and the SCADA communication network segment associated with that IED. As each installed cryptographic devices is visited by an installer to change parameter values, the SCADA master loses communication that IED until all cryptographic devices, one-by-one, have undergone parameter value changes. The lack of power system monitoring due to lack of communication between the IEDs that have undergone the parameter value change and the SCADA master may continue for days or even weeks, depending on how long it takes an installer(s) to visit all of the sites of the SCADA system. Moreover, if the parameter value (s) of the cryptographic device associated with the SCADA master are updated first, then the SCADA master will lose communications with all equipment on the SCADA communication network until all of the parameters values of the remaining cryptographic devices are similarly updated.

Figure 6:
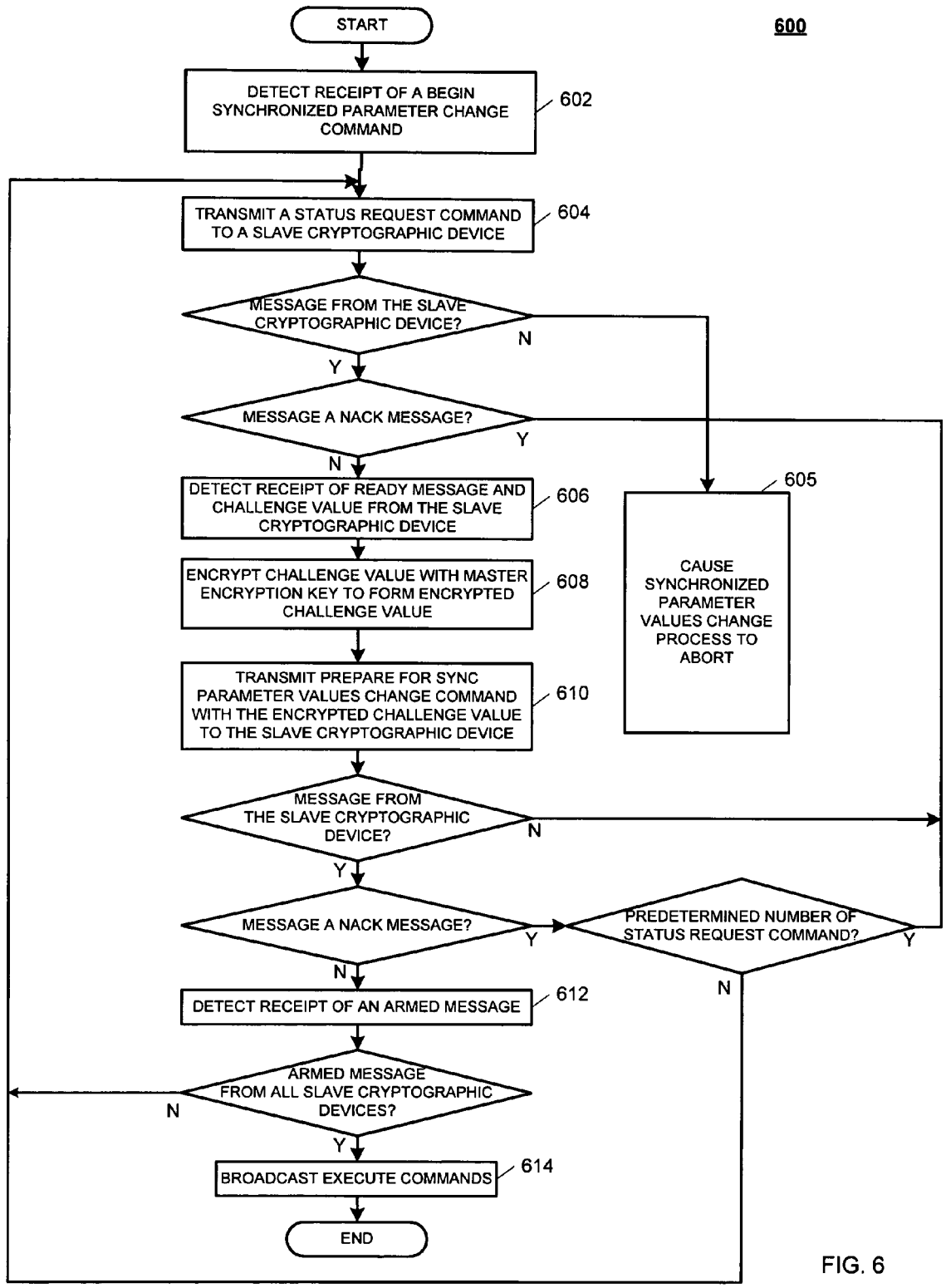
FIG. 6 is a flowchart of a synchronized parameter values change process according to the present invention.

FIG. 6 is a flowchart of a synchronized parameter values change process 600 according to the present invention. Performance of the synchronized parameter values change process 600 reduces SCADA system down-time when parameter values are changed or updated in installed cryptographic devices of the SCADA system 50. For ease of discussion, the microcontroller 85 of the master cryptographic device 66 acts as a master controlling the synchronized parameter values change process 600. The microcontrollers of the remaining cryptographic devices 60, 62, 64 respond as slaves to commands from the master cryptographic device 66. It should be understood however, that the microcontrollers of the cryptographic devices 60, 62, 64, 66 may act as the master or the slave, or that another suitably configured SCADA system device may act as the master.

Figure 7:
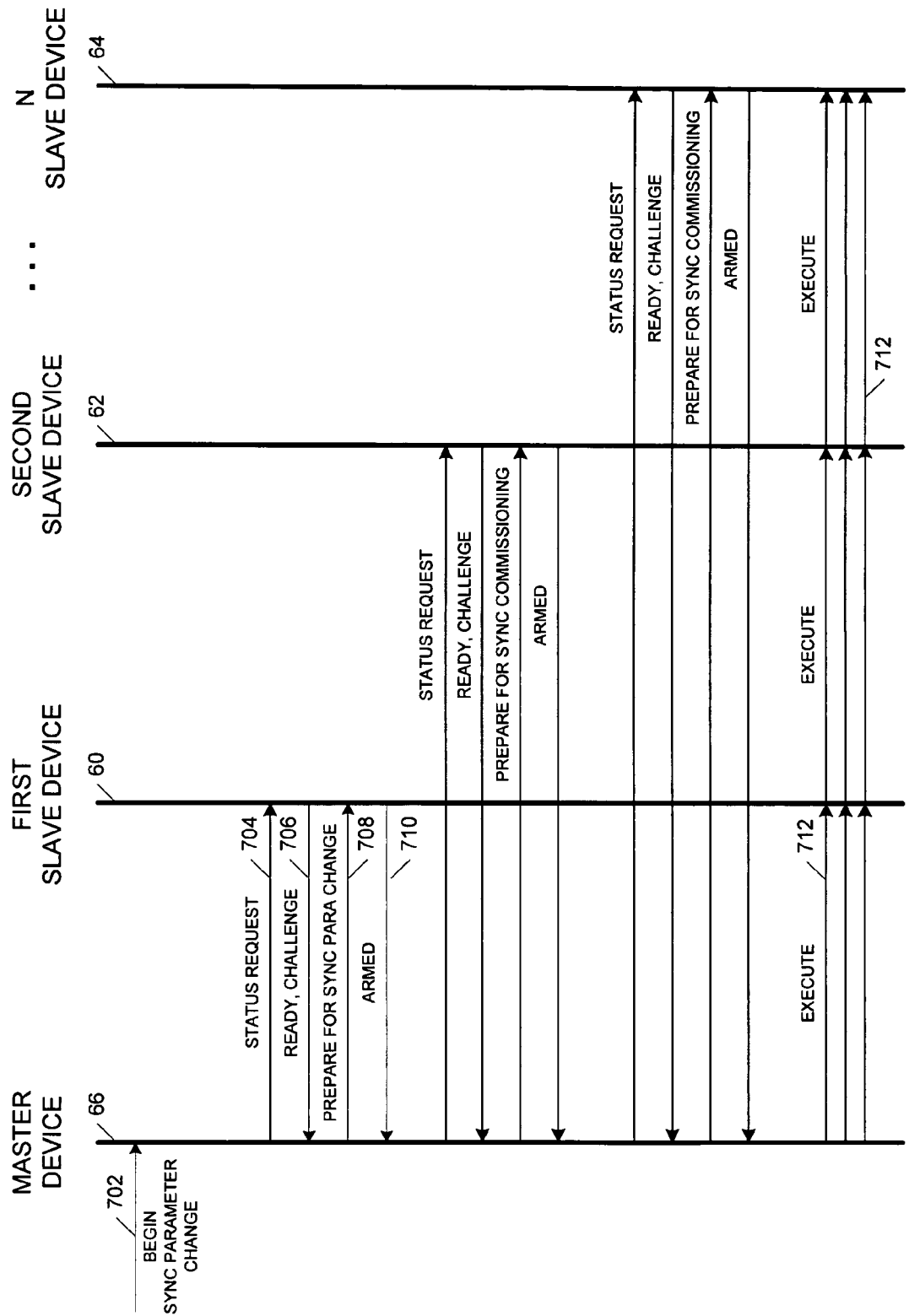
FIG. 7 is a ladder diagram of an exemplary communication flow between the master cryptographic device and the slave cryptographic devices during the synchronized parameter values change process of FIG. 6.

FIG. 7 is a ladder diagram 700 of an exemplary communication flow between the master cryptographic device 66 and the slave cryptographic devices 60, 62, 64 during the synchronized parameter values change process 600. Although the ladder diagram 700 illustrates one communication flow that occurs during the synchronized parameter values change 700, it is contemplated that other communication flows may be implemented to enable the synchronized parameter values change 700.

A second set of parameter values, previously installed in the memories of respective cryptographic devices by an installer traveling from cryptographic device to cryptographic device, remain inactive until activated by the microcontroller 85. As a result, operation of the cryptographic devices using the first set of parameter values remains unaffected during and after installation of the second set of parameter values until the second set of parameter values are activated by the microcontroller 85.

Referring to FIGS. 6 and 7, the synchronized parameter values change process 600 begins when, upon receipt of a BEGIN SYNC PARAMETER CHANGE command 702, the microcontroller 85 of the master cryptographic device 66 begins the process of transitioning each of the slave cryptographic devices 60, 62, 64 from a first set of parameter values to a second set of parameter values.

After receiving the BEGIN SYNC PARAMETER CHANGE command 702, the master cryptographic device 66 begins exchanging a series of commands/messages in a sequential, or polling fashion, with each of the slave cryptographic device 60, 62, 64. The microcontroller 85 may begin the sequential polling by transmitting a STATUS REQUEST command 704 to a first slave cryptographic device, or the slave cryptographic device 60 (step 604). The slave cryptographic device 60 may respond in one of two ways. If it is not properly configured to allow the synchronized parameter values change, it will respond with a negative acknowledgement (NACK) message to the master cryptographic device 66, and if it is properly configured to allow the synchronized parameter values change, it will respond with a ready acknowledgement (RDY) message and a "challenge value" 706 to the master cryptographic device 66. The challenge value is used for encrypting/decrypting and authentication purposes.

Upon receiving a NACK message from the slave cryptographic device 60, the microcontroller 85 causes the synchronized parameter values change process 600 to be aborted. Similarly, if no response is received from the slave cryptographic device 60 within a predetermined time period, the microcontroller 85 causes the synchronized parameter values change process 600 to be aborted (step 605).

Conversely, upon receiving the RDY message and challenge value 508 from the slave cryptographic device 60, the microcontroller 85 proceeds with the synchronized parameter values change process 600 (step 606). The microcontroller 85 first encrypts the challenge value with its master encryption key to form an encrypted challenge value (step 608), and then causes a PREPARE FOR SYNC PARAMETER VALUES CHANGE command 708 to be transmitted to the slave cryptographic device 60 (step 610). The PREPARE FOR SYNC PARAMETER VALUES CHANGE command 708 includes the encrypted challenge value calculated by the microcontroller 85.

When received, the encrypted challenge value is decrypted by the microcontroller of the slave cryptographic device 60 to form a decrypted challenge value, and compared to the original challenge value generated by the slave cryptographic device 60. If the decrypted challenge value does not match the original challenge value, the slave cryptographic device 60 responds with a NACK message to the master cryptographic device 66.

Upon receipt of the NACK message, the microcontroller 85 determines whether a predetermined number of STATUS REQUEST commands 704 have been previously sent to the slave cryptographic device 60. If the predetermined number of STATUS REQUEST commands 704 have not been previously sent to the slave cryptographic device 60, the microcontroller 86 again cause the STATUS REQUEST command 704 to be transmitted to the slave cryptographic device 60 (step 604). The message exchange between the master cryptographic device 66 and the slave cryptographic device 60 repeats until the predetermined number of STATUS REQUEST commands 704 to the slave cryptographic device 60 have been reached or until receipt of an ARMED message 710 from the slave cryptographic device 60. If the predetermined number of STATUS REQUEST messages 702 has been sent to the slave cryptographic device 60, the microcontroller 85 causes the synchronized parameter values change process 600 to be aborted (step 605).

If the decrypted challenge value matches the original challenge value, the slave cryptographic device 60 responds to the master cryptographic device 66 with the ARMED message 710 to indicate a ready condition for synchronized parameter values change. Upon receipt of the ARMED message 710 from the slave cryptographic device 60 (step 612), the microcontroller 85 causes the STATUS REQUEST command 704 to be transmitted to the second slave cryptographic device 62.

The process is repeated for each slave cryptographic device of the SCADA system 50. If any of the slave cryptographic devices of the SCADA system 50 respond with a NACK message, the microcontroller 85 causes the synchronized parameter values change process 600 to be aborted.

When all of the slave cryptographic devices 60, 62, 64 have been poled and have responded with the ARMED message 710 indicating a ready condition for synchronized parameter values change, the microcontroller 85 causes a pre-determined number of EXECUTE commands 712 to be simultaneously broadcasted to the slave cryptographic devices 60, 62, 64 to cause them to begin operating using the second set of parameter values (step 614).

The master cryptographic device 66 begins secure mode operation using the second set of parameter values after the last EXECUTE command 712 is broadcast. The slave cryptographic devices 60, 62, 64 begin secure mode operation using the second set of parameter values upon receipt of the EXECUTE command 712, provided the slave cryptographic device(s) 60, 62, 64 have previously successfully transmitted the ARMED message 710.

Performance of the synchronized parameter values change process 600 via the serial polling scheme described above yields a total time elapsed between transmission of the first EXECUTE command 712 and the last EXECUTE command 712, of less than one-tenth of one second. During that very brief time, SCADA communications between the master cryptographic device 66 and the slave cryptographic devices 60, 62, 64 are temporarily non-operational.

As may be apparent from the above discussion, the slave cryptographic devices 60, 62, 64 authenticate commands and requests transmitted from the master encryption device 66 using an encrypted challenge/response scheme. It should be understood however, that other well known authentications schemes may be used.

As may also be apparent from the above discussion, the method and apparatus disclosed herein greatly reduces network downtime during installation and commissioning of cryptographic devices in a SCADA communication network, without compromising network security. The method and apparatus disclosed herein also greatly reduces network downtime during a parameter values change to the cryptographic devices of the SCADA communication network without compromising network security.

Although a preferred embodiment of the invention has been described for purposes of illustration, it should be understood that various changes, modifications and substitutions may be incorporated in the embodiment without departing from the spirit of the invention which is defined in the claims which follow.

What is claimed is:

1. A method for reducing communication system downtime when enabling cryptographic operation of a cryptographic system of the communication system upon receipt of a command to enable cryptographic operation, the cryptographic system including a first cryptographic device coupled to a plurality of second cryptographic devices via a communication network of the communication system, the method comprising the steps of:

causing a first cryptographic mode of the first cryptographic device and the plurality of second cryptographic devices to be suspended;

the first cryptographic device sequentially determining a readiness state of each of the plurality of second cryptographic devices, wherein a first readiness state indicates said first cryptographic device and one of said plurality of second cryptographic devices is able to participate in synchronized cryptographic communications and a second readiness state indicates said first cryptographic device and one of said plurality of second cryptographic devices are not able to participate in synchronized cryptographic communications;

causing the first cryptographic device and each of the plurality of second cryptographic devices to synchronously switch to operate in a second cryptographic mode if each of the plurality of second cryptographic devices are determined to have first readiness state, wherein the first cryptographic mode is a pass-through mode rendering said first cryptographic device and one of said plurality of second cryptographic devices transparent to the communications network, and the second cryptographic mode is a secure mode enabling cryptographic operation on data transmitted via the communication network;

wherein the step of causing the first cryptographic mode of the first cryptographic device and the plurality of second cryptographic devices to be suspended comprises:

detecting receipt of a first command to synchronously enable said second cryptographic mode operation of the first cryptographic device and the plurality of second cryptographic devices; and in response to detecting receipt of the first command, broadcasting a number of second commands to the first cryptographic device and the plurality of second cryptographic devices to suspend the first cryptographic mode and switch to the second cryptographic mode wherein the step of sequentially determining the readiness state of each of the plurality of second cryptographic devices comprises:

(a) transmitting a third command to one of the plurality of second cryptographic devices that has not transmitted a second message, the third command requesting a status of the one of the plurality of second cryptographic devices, the second message including an indication of the first state;

(b) detecting receipt of a first message from the one of the plurality of second cryptographic devices, the first message including a challenge value;

(c) encrypting the challenge value with an encryption key of the first cryptographic device to form an encrypted challenge value;

(d) transmitting a fourth command to the one of the plurality of second cryptographic devices, the fourth command including the encrypted challenge value;

(e) detecting receipt of the second message from the one of the plurality of second cryptographic devices, receipt of the second message indicating successful decryption and authentication of the encrypted challenge value; and (f) iteratively repeating steps (a)-(e) until detecting receipt of the second message from each of the plurality of second cryptographic devices.

2. The method of claim 1, further comprising the step of causing the first cryptographic device and the plurality of second cryptographic devices to operate in the first mode if at least one of the plurality of second cryptographic devices is determined to have a second state, the first mode rendering the first cryptographic device and the plurality of second cryptographic devices transparent to the communication network.

3. The method of claim 1, further comprising the step of causing the first cryptographic device and the plurality of second cryptographic devices to operate in the first mode if at least one of the plurality of second cryptographic devices is not responsive to the first cryptographic device.

4. The method of claim 1, wherein the first cryptographic device comprises a first microcontroller, the first microcontroller having a first microprocessor and a first memory coupled to the first microprocessor, and wherein each of the plurality of second cryptographic devices comprise a second microcontroller having a second microprocessor and a second memory coupled to the second microprocessor.

5. The method of claim 1, wherein the first cryptographic device is configured to encrypt data transmitted by a master device of the communication system and to decrypt and authenticate data received by the master device when the first cryptographic device is operating in the second mode.

6. The method of claim 5, wherein each of the plurality of second cryptographic devices are configured to encrypt data transmitted by a corresponding intelligent electronic device coupled to the second cryptographic device, and to decrypt and authenticate data subsequently received by the corresponding second intelligent electronic device when each of the plurality of second cryptographic devices are operating in the second mode.

7. The method of claim 6, wherein the communication system is configured to monitor an electric power system, and wherein the data is selected from the group consisting of an electric power system line current, an electric power system bus voltage, an electric power system switch status, a command from the first cryptographic device and a message from the plurality of second cryptographic devices.

8. The method of claim 1, wherein each of the first cryptographic device and the plurality of second cryptographic devices are placed in the first mode upon installation in the cryptographic system.

9. The method of claim 1, where the communication system comprises a supervisory control and data acquisition (SCADA) system, and wherein the communication network comprises a SCADA communication network.

10. A method for reducing communication system downtime when changing at least one parameter value of a cryptographic system of the communication system, the cryptographic system including a first cryptographic device coupled to a plurality of second cryptographic devices via a communication network, each of the first cryptographic device and the plurality of second cryptographic devices operating in a second mode using a first set of parameter values, the method comprising:

detecting receipt of a first command to synchronously switch from a first cryptographic mode to a second cryptographic mode using a second set of parameter values for the plurality of second cryptographic devices and the first cryptographic device, wherein the first cryptographic mode is a pass-through mode rendering said first device and one of said plurality of second cryptographic devices transparent to the communications system and the second cryptographic mode is a secure mode enabling cryptographic operation on data transmitted via the communication system;

sequentially determining a readiness state of each of the plurality of second cryptographic devices, wherein a first readiness state indicates said first device and one of said plurality of second devices is able to participate in synchronized cryptographic communications and a second readiness state indicates said first device and one of said plurality of second devices are not able to participate in synchronized cryptographic communications; and causing each of the plurality of second cryptographic devices and the first cryptographic device to synchronously switch to operate in the second mode using the second set of parameter values if the readiness state of each of the plurality of second cryptographic devices are determined to have the first state, wherein at least one of the second set of parameter values is different from the first set of parameter values;

wherein the step of sequentially determining the readiness state of each of the plurality of second cryptographic devices comprises:

(a) transmitting a second command to one of the plurality of second cryptographic devices that has not transmitted a second message, the second command requesting a status of the one of the plurality of second cryptographic devices, the second message including an indication of the first state;

(b) detecting receipt of a first message from the one of the plurality of second cryptographic devices, the first message including a challenge value;

(c) encrypting the challenge value with an encryption key of the first cryptographic device to form an encrypted challenge value;

(d) transmitting a third command to the one of the plurality of second cryptographic devices, the third command including the encrypted challenge value;

(e) detecting receipt of the second message from the one of the plurality of second cryptographic devices, receipt of the second message indicating successful decryption and authentication of the encrypted challenge value; and (f) iteratively repeating steps (a)-(e) until detecting receipt of the second message from each of the plurality of second cryptographic devices.

11. The method of claim 10, further comprising the step of causing the plurality of second cryptographic devices and the first cryptographic device to operate in the second mode using the first set of parameter values if at least one of the plurality of second cryptographic devices is determined to have a second state.

12. The method of claim 10, further comprising the step of causing the plurality of second cryptographic devices and the first cryptographic device to operate in the second mode using the first set of parameter values if at least one of the plurality of second cryptographic devices is not responsive to the first cryptographic device.

13. The method of claim 10, wherein the first cryptographic device comprises a first microcontroller, the first microcontroller having a first microprocessor and a first memory coupled to the first microprocessor, and wherein each of the plurality of second cryptographic devices comprise a second microcontroller having a second microprocessor and a second memory coupled to the second microprocessor.

14. The method of claim 10, wherein the second mode enables cryptographic operation on data transmitted via the communication network.

15. The method of claim 10, wherein the first cryptographic device is configured to encrypt data transmitted by a master device of the communication system and to decrypt and authenticate data subsequently received by the master device when the first cryptographic device is operating in the second mode.

16. The method of claim 15, wherein each of the plurality of second cryptographic devices is configured to encrypt data transmitted by a corresponding intelligent electronic device coupled to the second cryptographic device, and to decrypt and authenticate data subsequently received by the corresponding second intelligent electronic device when each of the plurality of second cryptographic devices is operating in the second mode.

17. The method of claim 16, wherein the communication system is configured to monitor and protect an electric power system, and wherein the data is selected from the group consisting of an electric power system line current, an electric power system bus voltage, an electric power system switch status, a command from the first cryptographic device and a message from the plurality of second cryptographic devices.

18. The method of claim 10, wherein the at least one of the second set of parameter values is selected from the group consisting of an encryption key, a cryptographic device configuration, a data rate, a maximum data frame length, a maximum dead time, a number of data bits, a number of stop bits and a parity bit configuration.

19. The method of claim 10, wherein the second set of parameters is installed in each of the first cryptographic device and the plurality of second cryptographic devices prior to detecting receipt of the first command to synchronously enable second mode operation using a second set of parameter values.

20. The method of claim 10, where in the communication system comprises a supervisory control and data acquisition (SCADA) system, wherein the communication network comprises a SCADA communication network, and wherein the cryptographic system includes first cryptographic mode that renders the first cryptographic device and the plurality of second cryptographic devices transparent to the SCADA communications network.

21. A method for reducing communication system downtime when enabling cryptographic operation of a cryptographic system of the communication system upon receipt of a command to enable cryptographic operation, the cryptographic system including a first cryptographic device coupled to a plurality of second cryptographic devices via a communication network of the communication system, the method comprising the steps of:

the first cryptographic device sequentially determining a readiness state of each of the plurality of second cryptographic devices, wherein a first readiness state indicates said first device and one of said plurality of second devices are able to participate in synchronized cryptographic communications and a second readiness state indicates said first device and one of said plurality of second devices are not able to participate in synchronized cryptographic communications;

causing a first cryptographic device and each of the plurality of second cryptographic devices to synchronously switch to operate in a second cryptographic mode if the readiness state of each of the plurality of second cryptographic devices is determined to have the first readiness state, wherein the first cryptographic mode is a pass-through mode rendering said first cryptographic device or one of said plurality of second devices transparent to the communications system and the second mode is a secure cryptographic mode that enables cryptographic operation on data transmitted via the communication system;

causing the first cryptographic mode of the cryptographic device and the plurality of second cryptographic devices to be suspended;

detecting receipt of a first command to synchronously enable second cryptographic mode operation of the first cryptographic device and the plurality of second cryptographic devices;

in response to detecting receipt of the first command, broadcasting a number of second commands to the first cryptographic device and the plurality of second cryptographic devices to cause the first cryptographic device and the plurality of second cryptographic devices to suspend the first cryptographic mode;

wherein the step of sequentially determining the first and second readiness state of each of the plurality of second cryptographic devices comprises:
  (a) transmitting a third command to one of the plurality of second cryptographic devices that has not transmitted a second message, the third command requesting a status of the one of the plurality of second cryptographic devices, the second message including an indication of the first readiness state;
  (b) detecting receipt of a first message from the one of the plurality of second cryptographic devices, the first message including a challenge value;
  (c) encrypting the challenge value with an encryption key of the first cryptographic device to form an encrypted challenge value;
  (d) transmitting a fourth command to the one of the plurality of second cryptographic devices, the fourth command including the encrypted challenge value;
  (e) detecting receipt of the second message from the one of the plurality of second cryptographic devices, receipt of the second message indicating successful decryption and authentication of the encrypted challenge value; and
  (f) iteratively repeating steps (a)-(e) until detecting receipt of the second message from each of the plurality of second cryptographic devices.

22. The method of claim 21, further comprising the step of causing a first cryptographic mode of the first cryptographic device and the plurality of second cryptographic devices, the first cryptographic mode comprising a cryptographic mode, rendering the first cryptographic device and the plurality of second cryptographic devices transparent to the communication network.

23. The method of claim 22, further comprising the step of causing the first cryptographic device and the plurality of second cryptographic devices to operate in the first mode if at least one of the plurality of second cryptographic devices are determined to have a second state.

24. The method of claim 22, further comprising the step of causing the first cryptographic device and the plurality of second cryptographic devices to operate in the first mode if at least one of the plurality of second cryptographic devices are not responsive to the first cryptographic device.

25. The method of claim 21, wherein the first cryptographic device comprises a first microcontroller, the first microcontroller having a first microprocessor and a first memory coupled to the first microprocessor, and wherein each of the plurality of second cryptographic devices comprise a second microcontroller having a second microprocessor and a second memory coupled to the second microprocessor.

26. An apparatus for reducing communication system downtime when enabling cryptographic operation of a cryptographic system of the communication system, the communication system including a communication network, the apparatus comprising:
  a first cryptographic device comprising a first microcontroller; and
  a plurality of second cryptographic devices coupled to the first cryptographic device via the communication network, each of the plurality of second cryptographic devices comprising a second microcontroller, wherein the first microcontroller is configured to:
  cause a first cryptographic mode of the first cryptographic device and the plurality of second cryptographic devices to be suspended on reception of a first command, wherein the first cryptographic mode is a pass-through mode rendering said first cryptographic device or one of the plurality of second cryptographic devices transparent to the communication network, and a second cryptographic mode is a secure mode enabling cryptographic operations on data transmitted via the communication network,
  sequentially determine a readiness state of each of the plurality of second cryptographic devices, wherein the first readiness state indicates said first device and one of the plurality of second devices are able to participate in synchronized cryptographic communications, and a second readiness state indicates said first device and one of said plurality of second devices are not able to participate in synchronized cryptographic communications; and
  cause the first cryptographic device and each of the plurality of second cryptographic devices to synchronously switch to operate in a second mode if the readiness state of each of the plurality of second cryptographic devices is determined to have the first state;
  detect receipt of a first command to synchronously enable second mode operation of the first cryptographic device and the plurality of second cryptographic devices;
  in response to detecting receipt of the first command, broadcast a number of second commands to the plurality of second cryptographic devices to cause the plurality of second cryptographic devices to suspend the first mode,
  wherein the first microcontroller is further configured to:
  (a) transmit a third command to one of the plurality of second cryptographic devices that has not transmitted a second message, the third command requesting a status of the one of the plurality of second cryptographic devices, the second message including an indication of the first state;
  (b) detect receipt of a first message from the one of the plurality of second cryptographic devices, the first message including a challenge value;
  (c) encrypt the challenge value with an encryption key of the first cryptographic device to form an encrypted challenge value;
  (d) transmit a fourth command to the one of the plurality of second cryptographic devices, the fourth command including the encrypted challenge value;
  (e) detect receipt of the second message from the one of the plurality of second cryptographic devices, receipt of the second message indicating successful decryption and authentication of the encrypted challenge value; and
  (f) iteratively repeat steps (a)-(e) until detecting receipt of the second message from each of the plurality of second cryptographic devices.

27. The apparatus of claim 26, wherein the first microcontroller is further to cause the first cryptographic device and the plurality of second cryptographic devices to operate in the first mode if the readiness state of at least one of the plurality of second cryptographic devices is determined to have a second state.

28. The apparatus of claim 26, wherein the first microcontroller is further to cause the first cryptographic device and the plurality of second cryptographic devices to operate in the first mode if at least one of the plurality of second cryptographic devices is not responsive to the first cryptographic device.

29. The apparatus of claim 26, wherein the first microcontroller includes a first microprocessor and a first memory coupled to the first microprocessor, and wherein each of the plurality of second microcontrollers include a second microprocessor and a second memory operatively coupled to the second microprocessor.

30. The apparatus of claim 26, wherein the first cryptographic device is configured to encrypt data transmitted by a master device of the communication system and to decrypt and authenticate data subsequently received by the master device when the first cryptographic device is operating in the second mode.

31. The apparatus of claim 30, wherein each of the plurality of second cryptographic devices is configured to encrypt data transmitted by a corresponding intelligent electronic device coupled to the second cryptographic device, and to decrypt and authenticate data subsequently received by the corresponding second intelligent electronic device when each of the plurality of second cryptographic devices is operating in the second mode.

32. The apparatus of claim 31, wherein the communication system is configured to monitor an electric power system, and wherein the data is selected from the group consisting of an electric power system line current, an electric power system bus voltage, an electric power system switch status, a command from the first cryptographic device and a message from the plurality of second cryptographic devices.

33. The apparatus of claim 26, wherein each of the first cryptographic device and the plurality of second cryptographic devices is placed in the first mode upon installation in the cryptographic system.

34. The apparatus of claim 26, wherein the communication system comprises a supervisory control and data acquisition (SCADA) system, and wherein the communication network comprises a SCADA communication network.

35. An apparatus for reducing communication system downtime when changing at least one parameter value of a cryptographic system of the communication system, the communication system including a communication network, the apparatus comprising:
a first cryptographic device operating in a second mode using a first set of parameter values, the first cryptographic device comprising a first microcontroller; and
a plurality of second cryptographic devices coupled to the first cryptographic device via the communication network, each of the plurality of second cryptographic devices operating in a second cryptographic mode, using a first set of parameter values, each of the plurality of second cryptographic devices comprising a second microcontroller, wherein a first cryptographic mode is a pass-through mode rendering said first cryptographic device and one of said plurality of second cryptographic devices transparent to the communication system, and the second cryptographic mode is a secure mode enabling cryptographic operation on data transmitted via the communication system, and wherein the first microcontroller is configured to:
detect receipt of a first command to synchronously enable second cryptographic mode operation using a second set of parameter values for the plurality of second cryptographic devices and the first cryptographic device,
sequentially determine a readiness state of each of the plurality of second cryptographic devices, wherein a first readiness state indicates said first cryptographic device and one of said plurality of second cryptographic devices are able to participate in synchronized cryptographic communications and a second readiness state indicates said first cryptographic device and one of said plurality of second cryptographic devices are not able to participate in synchronized cryptographic communications, and
cause each of the plurality of second cryptographic devices and the first cryptographic device to synchronously switch to operate in the second cryptographic mode using the second set of parameter values if each of the readiness state of the plurality of second cryptographic devices are determined to have a the first readiness state, and wherein at least one of the second set of parameter values is different from the first set of parameter values;
wherein the first microcontroller is further configured to:
(a) transmit a second command to one of the plurality of second cryptographic devices that has not transmitted a second message, the second command requesting a status of the one of the plurality of second cryptographic devices, the second message including an indication of the first state;
(b) detect receipt of a first message from the one of the plurality of second cryptographic devices, the first message including a challenge value;
(c) encrypt the challenge value with an encryption key of the first cryptographic device to form an encrypted challenge value;
(d) transmit a third command to the one of the plurality of second cryptographic devices, the third command including the encrypted challenge value;
(e) detect receipt of the second message from one of the plurality of second cryptographic devices, receipt of the second message indicating successful decryption and authentication of the encrypted challenge value; and
(f) iteratively repeat steps (a)-(e) until detecting receipt of the second message from each of the plurality of second cryptographic devices.

36. The apparatus of claim 35, wherein the first microcontroller is further configured to cause the first cryptographic device and the plurality of second cryptographic devices to operate in the second mode using the first set of parameter values if at least one of the plurality of second cryptographic devices is determined to have a second state.

37. The apparatus of claim 35, wherein the first microcontroller is further configured to cause the first cryptographic device and the plurality of second cryptographic devices to operate in the second mode using the first set of parameter values if at least one of the plurality of second cryptographic devices is not responsive to the first cryptographic device.

38. The apparatus of claim 35, wherein the second cryptographic mode enables cryptographic operation on data transmitted via a communication network of the communication system.

39. The apparatus of claim 35, wherein the first cryptographic device is configured to encrypt data transmitted by a master device of the communication system and to decrypt and authenticate data subsequently received by the master device when the first cryptographic device is operating in the second cryptographic mode.

40. The apparatus of claim 39, wherein each of the plurality of second cryptographic devices is configured to encrypt data transmitted by a corresponding intelligent electronic device coupled to the second cryptographic device, to decrypt and authenticate data subsequently received by the corresponding second intelligent electronic device when each of the plurality of second cryptographic devices is operating in the second cryptographic mode.

41. The apparatus of claim 40, wherein the communication system is configured to monitor an electric power system, and wherein the data is selected from the group consisting of an electric power system line current, an electric power system bus voltage, an electric power system switch status, a command from the first cryptographic device and a message from the plurality of second cryptographic devices.

42. The apparatus of claim 35, wherein the second set of parameters is installed in each of the first cryptographic device and the plurality of second cryptographic devices prior to detecting receipt of the first command to synchronously enable second cryptographic mode operation using a second set of parameter values.

43. The apparatus of claim 35, where in the communication system comprises a supervisory control and data acquisition (SCADA) system, wherein the communication network comprises a SCADA communication network, and wherein the cryptographic system includes a first cryptographic mode comprising a cryptographic mode that renders the first cryptographic device and the plurality of second cryptographic devices transparent to the SCADA communication network.

* * * * *